(12) United States Patent
Schroeder

(10) Patent No.: US 11,277,741 B2
(45) Date of Patent: Mar. 15, 2022

(54) AUTHENTICATION SYSTEM FOR AN AT LEAST PARTLY AUTONOMOUS VEHICLE

(71) Applicant: Bayerische Motoren Werke Aktiengesellschaft, Munich (DE)

(72) Inventor: Astrid Schroeder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/570,326

(22) Filed: Sep. 13, 2019

(65) Prior Publication Data

US 2020/0008061 A1  Jan. 2, 2020

Related U.S. Application Data

(63) Continuation of application No. PCT/EP2018/055082, filed on Mar. 1, 2018.

(30) Foreign Application Priority Data

Mar. 14, 2017  (DE) ...................... 10 2017 204 169.2

(51) Int. Cl.
*H04W 12/06* (2021.01)
*H04W 4/40* (2018.01)
(Continued)

(52) U.S. Cl.
CPC .......... *H04W 12/06* (2013.01); *G05D 1/0088* (2013.01); *G06Q 10/02* (2013.01);
(Continued)

(58) Field of Classification Search
CPC ....... H04W 12/06; H04W 4/40; H04W 4/025; H04W 4/42; H04W 4/44; G05D 1/0088;
(Continued)

(56) References Cited

U.S. PATENT DOCUMENTS 8,943,187 B1 * 1/2015 Saylor ..................... E05B 45/06
709/223
2008/0161986 A1 * 7/2008 Breed ..................... G01S 17/86
701/23

(Continued)

FOREIGN PATENT DOCUMENTS

| DE | 10 2014 001 836 A1 | 8/2014 |
|----|----|----|
| WO | WO 2015/169204 A1 | 11/2015 |
| WO | WO 2015/179765 A1 | 11/2015 |

OTHER PUBLICATIONS

PCT/EP2018/055082, International Search Report dated May 7, 2018 (Three (3) pages).

(Continued)

*Primary Examiner* — Edwin C Holloway, III
(74) *Attorney, Agent, or Firm* — Crowell & Moring LLP

(57) ABSTRACT

An at least partly autonomous vehicle includes a communication interface configured for vehicle-external communication, a memory configured to store at least one piece of authentication information, and a control unit configured to control the communication interface and to output the authentication information from the memory via the communication interface when the control unit receives an instruction for outputting the authentication information.

19 Claims, 6 Drawing Sheets

(51) Int. Cl.
*H04W 4/02* (2018.01)
*G06Q 10/02* (2012.01)
*G05D 1/00* (2006.01)

(52) U.S. Cl.
CPC .............. *H04W 4/025* (2013.01); *H04W 4/40* (2018.02); *G05D 2201/0213* (2013.01)

(58) Field of Classification Search
CPC ... G05D 2201/0213; G05D 2201/0212; G06Q 10/02; G08G 1/202; G08G 1/017; G08G 1/149; H04L 9/32; G07B 15/063
USPC ........................................ 340/5.8, 5.72, 928
See application file for complete search history.

(56) References Cited

U.S. PATENT DOCUMENTS

| | | | |
|---|---|---|---|
| 2015/0161832 A1* | 6/2015 | Esselink | B60R 25/24 340/5.22 |
| 2015/0337587 A1* | 11/2015 | Lu | G01C 21/3667 701/49 |
| 2015/0338852 A1* | 11/2015 | Ramanujam | G08G 1/202 701/2 |
| 2015/0339928 A1 | 11/2015 | Ramanujam | |
| 2016/0301698 A1* | 10/2016 | Katara | H04L 63/102 |
| 2017/0008490 A1* | 1/2017 | Sako | B60R 25/25 |
| 2017/0034774 A1 | 2/2017 | Nathanson et al. | |
| 2017/0213458 A1* | 7/2017 | Gordon | E01F 13/10 |
| 2017/0249846 A1* | 8/2017 | Ignaczak | H04N 5/23219 |
| 2017/0294130 A1* | 10/2017 | Donnelly | H04W 4/024 |
| 2019/0377344 A1* | 12/2019 | Ishioka | G01C 21/34 |
| 2020/0062265 A1* | 2/2020 | Wunderlich | B60W 60/0051 |

OTHER PUBLICATIONS

German Search Report issued in German counterpart application No. 10 2017 204 169.2 dated Nov. 24, 2017, with Statement of Relevancy (Eleven (11) pages).

* cited by examiner

AUTHENTICATION SYSTEM FOR AN AT LEAST PARTLY AUTONOMOUS VEHICLE

CROSS REFERENCE TO RELATED APPLICATIONS

This application is a continuation of PCT International Application No. PCT/EP2018/055082, filed Mar. 1, 2018, which claims priority under 35 U.S.C. § 119 from German Patent Application No. 10 2017 204 169.2, filed Mar. 14, 2017, the entire disclosures of which are herein expressly incorporated by reference.

BACKGROUND AND SUMMARY OF THE INVENTION

The invention relates to an at least partly autonomous vehicle and to a transport system with such an at least partly autonomous vehicle. A partly autonomous vehicle is understood here to be an at least one-track vehicle (e.g. car, motorcycle, . . . ) which performs driving functions at least partly autonomously. While the driving functions are performed autonomously, a user is preferably not required to take action or actively interfere with a driving process.

The invention is based on the knowledge that vehicles are not able to identify themselves to an interacting partner such as a user or a traffic object. Therefore, an autonomously functioning vehicle in particular cannot authorize or authenticate itself. In conventional systems an authorization or authentication always requires an intervention by a user.

The application-based order for a vehicle of a transport service may serve as an example. This normally involves a user ordering a vehicle by means of a telecommunication terminal (e.g. a smartphone) to transport him to a destination. The transport order is processed by a system to which the telecommunication terminal is communicatively connected, and the driver of the vehicle receives an order to collect the user at a transmitted position. The user then receives feedback as to where the vehicle of the transport service, which is driven by the driver who has accepted the order, is located. The user also receives a message on identification features of the vehicle and of the driver (e.g. number plate, name of the driver). If the vehicle now arrives at the transmitted position, the identity of the vehicle and/or of the driver is checked by the user on the basis of the identification features transmitted to him.

This does however not involve authentication by the vehicle with the user, but conversely authentication by the user with respect to the vehicle. It is not possible for the user to recognize whether the identification features of the driver and/or of the vehicle are reproduced in an unaltered manner. For example the driver may give a false name. Reliable authentication is not possible.

It is now the objective of the invention to make it possible for the vehicle also to authenticate itself or for an authorization to be able to be performed by the vehicle for certain geographical regions.

The invention therefore proposes a vehicle and a system according to the independent claims. Further developments of the invention are the subject matter of the dependent claims.

In a first aspect at least a partly autonomous vehicle is provided comprising at least one communication interface for vehicle-external communication, a memory which is designed to store at least one piece of authentication information, and a control unit which is designed to control the communication interface and to output the authentication information from the memory via the communication interface when the control unit receives an instruction for outputting the authentication information. It is to be understood here that the instruction may be a signal which is emitted by a signal transmitter within and/or outside the vehicle. For example a unit in the vehicle may output a corresponding instruction to the control unit. On the other hand, it is also possible, on receipt of the instruction via e.g. the communication interface, for the instruction to be fed to the vehicle from outside, and in particular from a telecommunication device.

The control unit can generate the authentication information from at least one unique identifier of the vehicle and/or from information supplied to the vehicle, preferably by means of a cryptographic method. The control unit can store the authentication information in the memory. The control unit can detect the supplied information at the at least one communication interface. The supplied information can in particular be ordering information. The control unit can evaluate the ordering information with regard to a destination, i.e. a geographical destination. The control unit can cause the vehicle to navigate to the destination. To this end the control unit emits directly or indirectly signals to actuators of the vehicle. The indirect emission is effected here via other vehicle control units, whilst direct emission is effected by the control unit directly to the respective actuators.

The control unit can output the authentication information via the at least one communication interface in ad-hoc communication, wirelessly, by wire and/or in near-field communication.

The vehicle may comprise a position-detecting unit which can determine a position of the vehicle and can output the position to the control unit. The control unit can output the at least one piece of authentication information in dependence on the position. In particular the position-detecting unit can here determine where the determined position is situated with respect to at least one stored geographical region and/or a geographical location. The geographical region can here be stored in a memory of the vehicle. The position may be determined at defined temporal and/or spatial distances. The output takes place, in particular, when the determined position is at a predetermined distance from the and/or within the at least one geographical region, coincides with the geographical region and/or if a boundary of the at least one geographical region is crossed. Entry into and exit from the geographical region can be determined here by the position-detecting unit.

The vehicle can comprise a monitoring unit which is designed to monitor a range of the vehicle and to output a monitoring function to the control unit. The control unit can then emit a signal in dependence on the monitoring information. The monitoring unit is, in particular, a presence and/or motion detecting unit. The signal emitted by the control unit may be emitted, in particular, to the at least one communication unit or the at least one communication interface. Therefore information based on the signal may be passed via the communication interface e.g. to a communication system and/or to a wireless communication device.

The vehicle can comprise an identification unit. The identification unit can detect person identification information and output this to the control unit. The person identification information may be output here on the basis of a biometric identification of a person, who in particular is situated in a region of the vehicle. For example the identification unit can detect a fingerprint, a voice, a retina as well as other biometric properties of a person and can compare these with information from a memory which is part of the vehicle or is functionally connected thereto. In particular biometric features for a person can be transmitted via the at least one communication interface to the vehicle. For example the biometric information may be communicated from a communication network or a telecommunication device to the vehicle. The control unit can then emit a signal in dependence on the identification information. The signal can be emitted to the communication interface or to a communication network by means of the communication interface. The communication network connects the vehicle in particular to a user's communication device. The signal or information based thereon indicates whether a person's identification was successful or not.

The control unit can monitor the at least one communication interface and, on receipt of an instruction, output the authentication information. The authentication information is preferably output here via the at least one communication interface.

The control unit can output the authentication information in dependence on configuration data and/or on the instruction. The configuration data can be detected here by the control unit by means of the communication interface and/or read from the memory. Here too, the memory may be a memory present in the vehicle or a memory functionally connected to the vehicle e.g. in a remote computer system, to which the vehicle is connected via a preferably wireless communication network.

In a further aspect a transport system is provided, comprising at least one transmitter which is designed to output at least one piece of ordering information to an at least partly autonomous vehicle, as described herein, and wherein the vehicle can perform an action in dependence on the ordering information and can communicate authentication information to the transmitter, in particular when the vehicle receives a predetermined instruction from the transmitter. The transmitter may be here part of the communication network. The transmitter may also be a communication device.

The transmitter can verify the authentication information using verification information. The verification information and the authentication information may be associated with the ordering information. The vehicle can communicate the at least one piece of authentication information to the transmitter, when a determined position of the vehicle is at a predetermined distance from a and/or within the at least one geographical region or coincides with the geographical region and/or crosses a boundary of the at least one geographical region.

The vehicle can output a position, monitoring information and/or identification information to the transmitter.

The transmitter can confirm the ordering information and/or a part thereof on the basis of verified authentication information, the position, the monitoring information and/or the identification information, define the same as completed, to terminate an order associated therewith and/or perform an action, in particular to control an actuator.

The transmitter may be a telecommunication device and/or a traffic object.

The invention will now be described also with regard to the figures, in which

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
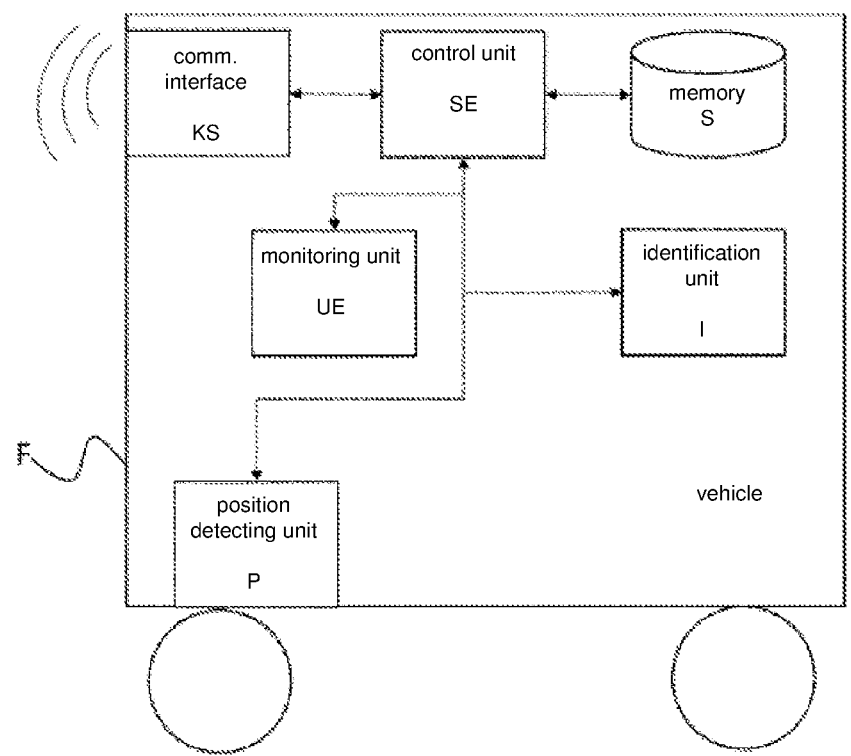
FIG. 1 schematically shows a vehicle according to the invention.

FIG. 1 shows a block diagram of a vehicle F as an example. The vehicle F comprises a control unit SE, a memory S and a communication interface KS. The control unit SE is here communicatively connected to the at least one communication interface KS and the memory S.

The memory S may be realized here as a volatile or non-volatile memory (RAM, ROM, flash memory, hard disc, . . . ). The memory S does not necessarily have to be provided in the vehicle, but may also be provided e.g. in a remote computer system. The control unit SE is then connected to the memory S in particular by using the at least one communication interface KS, for example via a wireless communication network. The communication interface KS may in particular be realized as a wired or wireless interface. The communication interface KS in particular allows the control unit SE and/or the vehicle F to communicate via a wireless communication network (GSM network, LTE network, 3G network, 4G network, 5G network, . . . ). Furthermore the vehicle F, as shown by way of example, comprises a position-detecting unit P. Also a monitoring unit UE and/or an identification unit I may be additionally provided. The authentication information is preferably stored in the memory S. The authentication information may be here at least part of a cryptographic key pair. The authentication information may be generated in particular by the control unit SE on the basis of a unique vehicle identifier as well as on the basis of data received via the at least one communication interface KS and/or data from the memory S. This can be done by using cryptographic methods, which are known for example for a symmetrical and/or asymmetrical encryption and/or signing of information (e.g. DES, AES, SHA256, . . . ).

The monitoring unit may comprise sensors, in particular in the vehicle F, but also sensors which e.g. detect an environment of the vehicle F. Examples of the sensors are here optical sensors, acoustic sensors, pressure sensors, motion sensors and/or presence detectors, which e.g. may be attached to seats, handles, covers and/or to cladding parts of the vehicle. In particular the monitoring unit UE detects whether a person is present in an interior of the vehicle, enters the interior and/or leaves it.

The identification unit I serves to identify the identity of a person. To this end the identification unit I can comprise acoustic and/or optical sensors. These may be identical or at least partly identical to those, which are comprised by the monitoring unit UE. The sensors of the identification unit I in particular serve here to detect biometric features. The detected biometric features (e.g. fingerprint, face, iris, voice, size, weight, . . . ) may be compared by the identification unit with data retrieved e.g. from the memory S. Based on the comparison performed by the identification unit I this can then emit a signal which indicates whether an identification of a person was successful. This can in particular be used to ensure that a certain person is present in the vehicle. Whereas a signal emitted by the monitoring unit UE predominantly therefore indicates whether a person is present in the vehicle, the identification unit can indicate by means of the signal emitted by it whether the correct person is present in the vehicle or the correct person has identified himself or herself to the identification unit.

The position-detecting unit P in particular serves to detect a position of the vehicle F. The position detected by the position-detecting unit P can then be compared by the position-detecting unit P with a geographical region, which in particular may be a geographical location. The at least one geographical region may also be stored in the memory S. Accordingly the position-detecting unit P can compare a detected position with the geographical region. In particular the position-detecting unit P can ascertain where the detected position is situated with respect to the at least one geographical region. If for example a distance from a geographical region is exceeded or undershot, the position-detecting unit P can emit a signal to the control unit, which indicates this fact. In particular the position-detecting unit P can also ascertain whether the vehicle F, based on the captured information, enters into a geographical region or exits from it. Correspondingly a respective signal may be emitted by the position-detecting unit P to the control unit SE.

The position-detecting unit, in particular, when the at least one geographical region is a geographical location, can also ascertain whether the position coincides with the geographical location. If this is the case, e.g. when a destination of a trip is reached, a signal may likewise be emitted by the position-detecting unit. The control unit can then evaluate the respective signal. Based on the evaluation the control unit SE outputs information via the at least one communication interface KS preferably to a communication network. The information output by the control unit SE thus can indicate for example whether a position, e.g. a destination of a trip, has been reached, whether a person has entered or exited the vehicle and whether the identity of a position matches a certain identity.

Figure 2:
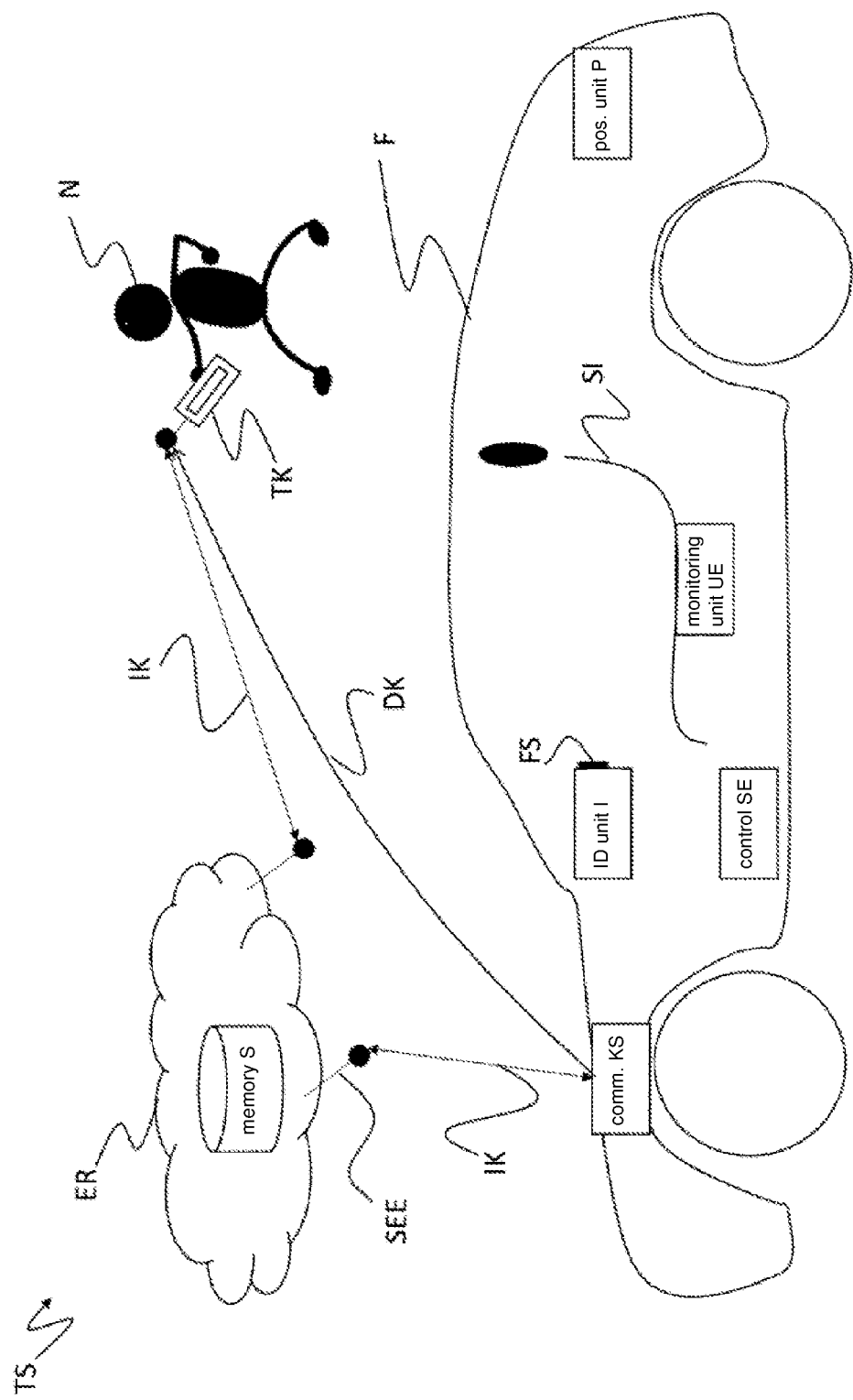
FIG. 2 schematically and by way of example shows a transport system according to the invention.

FIG. 2 shows a schematic overview of a transport system TS according to the invention. The vehicle F is again shown. Furthermore the units already described for FIG. 1 are shown for the vehicle F. In particular the at least one communication interface KS, the control unit SE, the monitoring unit UE, the identification unit I and the position-detecting unit P are again shown. Furthermore a remote computer system ER, for example a cloud system or a server system, which is connected to the vehicle F by means of the at least one communication interface KS and via a communication network (not shown), is schematically shown. As an example therefore the memory S in FIG. 2 is not shown as part of the vehicle F, but is part of the remote computer system ER. The memory S is thus functionally and communicatively connected here to the control unit SE via the communication interface KS. The connection of the units to the control unit SE shown by way of example in FIG. 1 is not shown in FIG. 2.

Only the monitoring unit UE is shown by way of example as a sensor in a seat for a user of the vehicle F, the sensor being for example a pressure sensor in a seat SI. The identification unit I may for example comprise a fingerprint sensor FS. Alternatively or additionally facial recognition or an iris scan may be performed using an optical sensor such as a camera and/or a microphone for voice recognition may be provided. A user N with a telecommunication device TK is also shown. The vehicle F or the control unit SE can now communicate (path DK) directly with the telecommunication device TK of the user N by means of the communication interface KS. However, indirect communication between the telecommunication device TK and the control unit SE is also possible, alternatively or additionally, for example via the remote computer system (paths IK).

The control unit SE can communicate with the telecommunication device TK of the user N. Therefore, the user N can send e.g. data from the telecommunication device TK to the vehicle F and can receive data from the vehicle F. In particular the user N can, by means of the telecommunication device TK (smartphone, tablet, laptop, . . . ) communicate ordering information directly or indirectly to the vehicle, whilst the vehicle can output the authentication information to the user directly or indirectly. The authentication information is here preferably output to the telecommunication device. The telecommunication device may also here be part of a street object, e.g. of a barrier or of an access restriction device. The vehicle F or the control unit SE then can, in particular in dependence on a signal emitted by the position-detecting unit P, directly or indirectly output the authentication information.

The remote computer system ER may here be part of a transport system TS. The remote computer system may comprise at least one transmitter/receiver unit SEE.

Looking at FIGS. 3a to 3j an application example is now described, which illustrates the use of the transport system TS. The user N can e.g. retrieve on his telecommunication device TK an application (app), which is provided by the transport system TS or for the transport system TS. The application can e.g. provide a picture of a map which is displayed on a display unit of the telecommunication device TK. Vehicles F1 to F3, which substantially correspond to the vehicle F, can then be displayed on the picture of the map.

Figure 3:
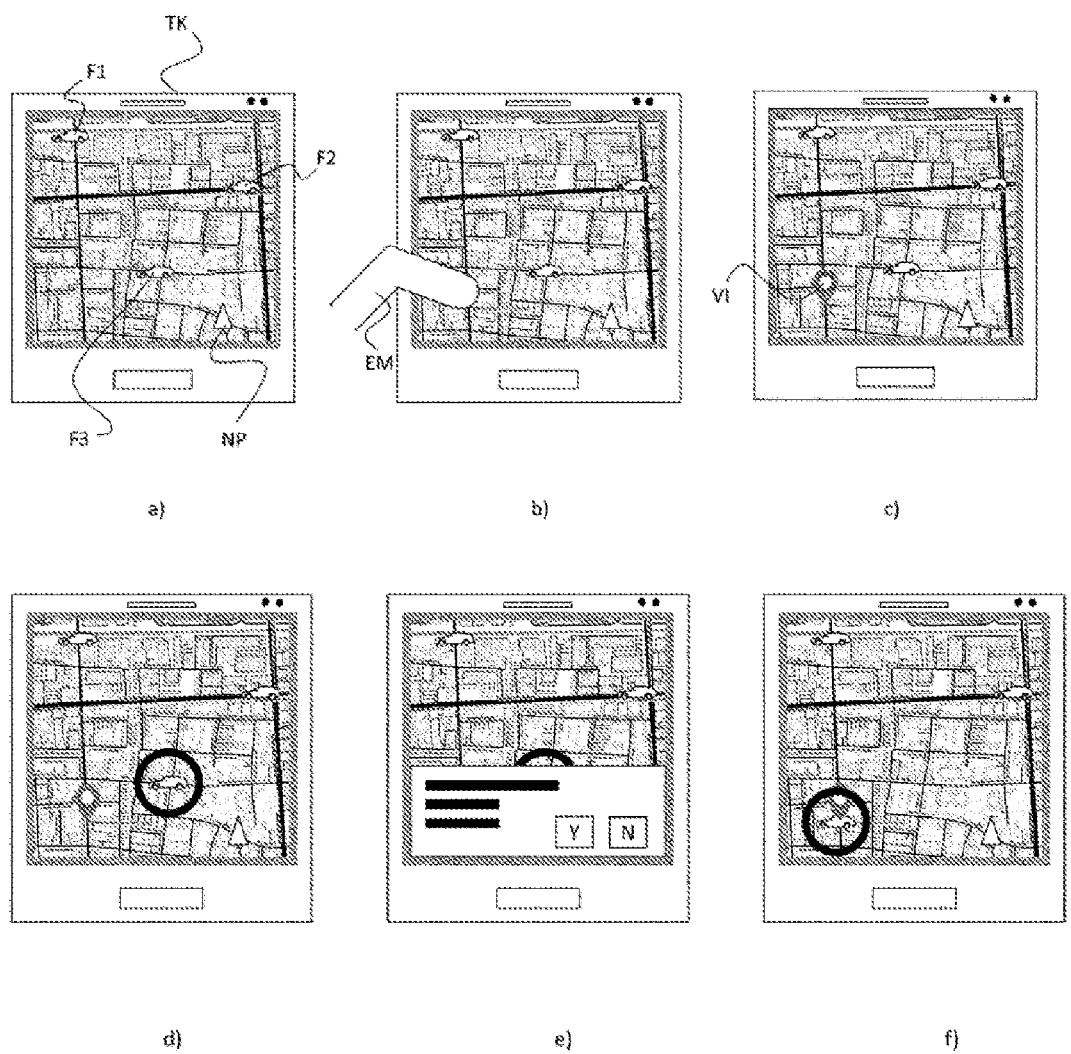
FIGS. 3a to 3j show an application example of the invention.
Figure 3:
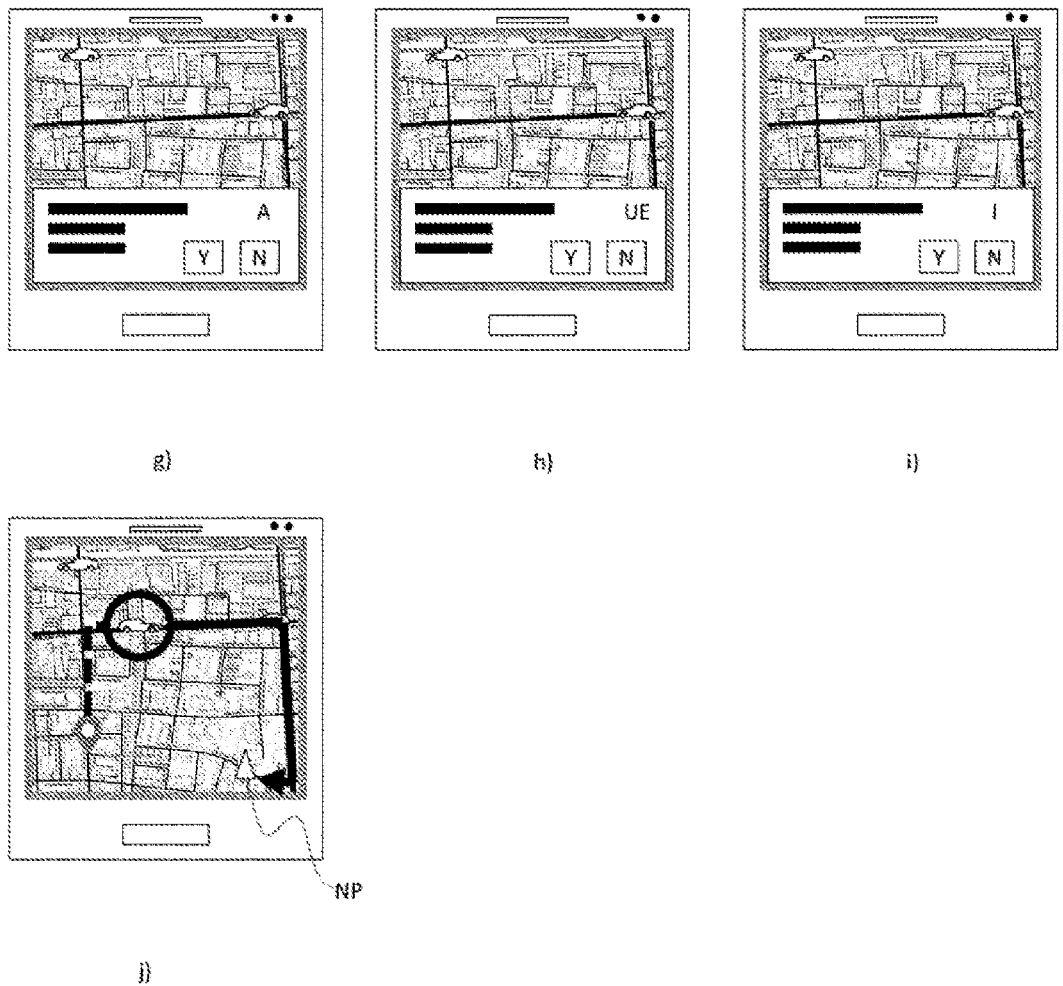

As illustrated in FIG. 3b, the user N can select, by means of an input means EM, a place on the depicted map to which a vehicle of the vehicles F1, F2, F3 is to be ordered. The place can, of course, also be determined automatically as the position of the user N, and preferably the user N merely confirms that a vehicle of the vehicles F1, F2, F3 is to be ordered to his or her position. In addition the user N can communicate further information, on the basis of which a vehicle of the vehicles F1, F2, F3 is selected, in particular by way of a remote computer system. The user N can e.g. indicate a number of persons and/or pieces of luggage which are/is to be transported, and/or a required transport volume (e.g. in liters, cm³, but also e.g. in the form of height, width and/or depth of a transport item). A vehicle which is suitable for the transport or the conveyance can then be automatically selected for the user N.

The place can be displayed on a picture of a map, e.g. by a visual indicator VI, as depicted in FIG. 3c. By means of possibly downstream interactions with the application, the user can then create an order for transport and/or communicate it to the remote computer system. A vehicle which is to perform or the order is then selected from the vehicles F1, F2, F3 by the remote computer system ER.

The vehicle, in the example the vehicle F3, may be displayed to the user N on the telecommunication device TK, as shown in FIG. 3d. The vehicle F3 can be optically highlighted (e.g. by a surrounding ring).

As indicated in FIG. 3e, data about the vehicle can now be communicated to the user. In particular, verification information can be communicated here from the remote computer system ER to the telecommunication device TK and/or another telecommunication device, which is required for later verification of authentication information of the vehicle. The user N can confirm that the selected vehicle is to be selected for the order. The transport system TS, i.e. the remote computer system ER, then communicates ordering information to the vehicle F3.

As schematically shown in FIG. 3f, the vehicle F3 then takes over the order as per the ordering information in that it performs actions which are determined by the control unit SE based on the ordering information. The control unit SE can in particular control actuators (engine, transmission, brakes, . . . ) in order to move the vehicle F3 to the position which corresponds to the place which was selected automatically or by the user N by means of the input means EM. As shown in FIG. 3f, the vehicle F3 therefore moves to the geographical region marked by means of the visual identifier VI. The vehicle F3 can for example execute a transport order (for commodities/goods) or a passenger conveyance order. When the vehicle F3 has arrived at the destination determined by the user N, a number of actions can be executed.

If, for example, a person is to be transported, the vehicle, on entry into the geographical region which corresponds to the place VI, can output the authentication information. The entry can be determined by the position-detecting unit P. In the order, the user N can define which person or persons shall be transported, for example in that he communicates an identifier of the person or persons or at least one representative to the remote computer system ER, e.g. a telephone number, a messenger ID, an email address, account information of a social network, etc. The vehicle F3 can then autonomously send the authentication information based on the identifier to at least one person. The authentication information can also here contain information about the identification of the vehicle F3. The verification information can be sent to the at least one person from the remote computer system. Thus the at least one person can verify the authentication information, e.g. by visually checking a piece of information indicated on a display unit and/or by means of a telecommunication terminal TK (e.g. by means of a smartphone), which also permits cryptographic verification using a computer unit, and based thereon can output information (e.g. green display for successful verification and red display for failed verification).

As depicted in FIG. 3g, information A about the verification of the authentication information can then be sent to the user N. The user N can then e.g. optionally initiate that the vehicle is opened.

If, for example, a packet is to be collected at the position determined by the visual identifier VI, a person placing e.g. the item into the vehicle can initially check whether authentication information of the vehicle matches verification information. A packet service provider thus can for example be given access to the interior of the vehicle in order to store an item such as a packet in the vehicle. Information about a corresponding authentication can be displaced to the user N on the telecommunication device TK. The user can also allow or deny access to the vehicle, for example by selecting the corresponding option (Y, N).

As indicated in FIG. 3h, the user N can also be sent information from the monitoring unit UE. In particular, it can thus be determined whether the vehicle F3 was entered or whether a change in the interior has taken place, for example as a result of an item deposited in the vehicle F3. Again, the user can decide whether for example the execution of the conveyance or transport order is to be continued.

In particular in the case of a passenger conveyance order it may be important that this person is also identified. If, for example, a person is to be collected by the vehicle F3 at the location identified by the visual indicator VI, it is perhaps crucial for the user N that the correct person is transported by the vehicle F3. To this end, as shown by way of example in FIG. 3i, corresponding information may be communicated by the identification unit I to the user N or the telecommunication device TK. The user N can then decide whether for example execution of the conveyance order or of the transport order is therefore to be further processed.

As illustrated in FIG. 3j, the user N can now follow a trip of the vehicle F3 on the picture of the map. To this end corresponding information is output by the vehicle, the remote computer system ER and is exchanged between the telecommunication device TK, the remote computer system ER and/or the vehicle F3. The position of the user N is depicted on the map as a triangle NP.

If the vehicle F3 now reaches the user N at the position NP, authentication information can be output by the vehicle to the user N or the telecommunication device TK. Based on the verification information which has been communicated to the user by the transport system TS, it can then be ascertained by both the vehicle and the user as to whether the correct vehicle F3 has arrived at the user. Equally, confirmation or completion of the order as per the ordering information can therefore be registered by the vehicle.

Figure 4:
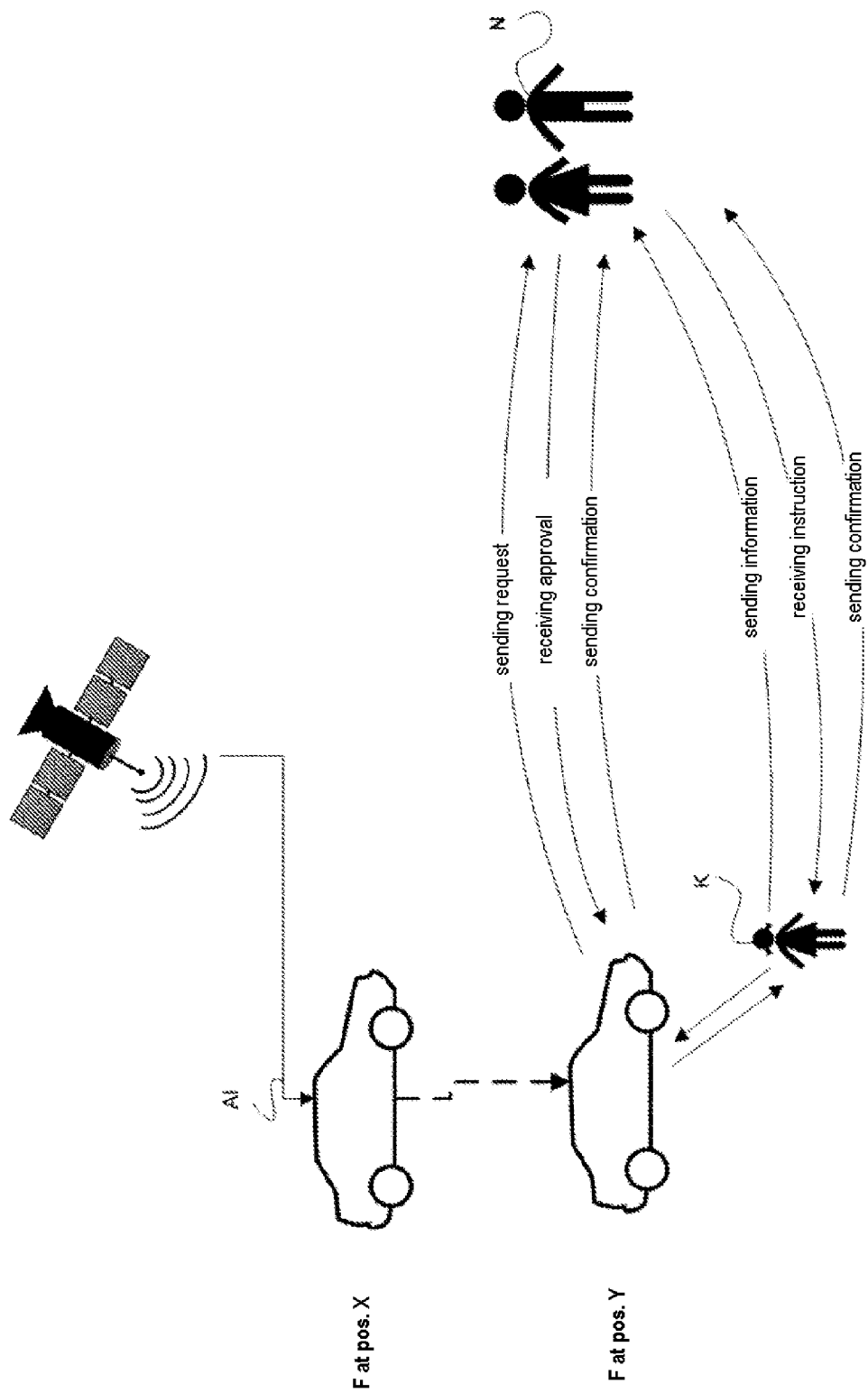
FIG. 4 shows a further exemplary application example of the invention.

With respect to FIG. 4, a further example of an application of the invention is to now be described.

A vehicle F receives ordering information AI e.g. from the remote computer system ER via a communication network (depicted as a satellite). The ordering information AI can be evaluated by the control unit SE. The ordering information AI may for example indicate that a person K is to be transported. The person K may be a child, for example. The vehicle F is then moved by the control unit SE on the basis of the evaluation and through direct or indirect control of vehicle actuators from position X to position Y. There can be provision here that the user N communicates the identifier to the remote computer system ER and/or the vehicle F, which can then autonomously determine a current position of the person K. The determination of the position of the person K can be performed by e.g. accessing a communication network, in particular by querying a network service such as a positioning service (e.g. via a programming interface, API) or by position determination, e.g. by means of triangulation.

On arrival at the position X the vehicle F now sends a query to the user N, e.g. a parent of the child, who has issued the transport order comprising the ordering information AI. This involves authentication information of the vehicle being output by the remote computer system ER and/or the vehicle to the user N or verification information being generated and transmitted. At the same time or within a defined timespan, the person K to be transported now also sends information to the user, e.g. via the remote computer system ER and by means of a telecommunication device of the person K, to the telecommunication device TK of the user N. The user N can now, on the one hand, send an approval (see FIG. 3g) to the vehicle by confirming the authentication information or after verifying the authentication information. The authentication information can be sent by the vehicle to the user as early as on receipt of the order. The user N then also sends an instruction, e.g. to board the vehicle, to the person K to be transported. The transmission of information is preferably here ensured by means of cryptographic methods in order to avoid and/or detect manipulation of the transmission of data. Monitoring can be carried out in the vehicle by means of the monitoring unit UE or the identification unit I with a view to check whether the person K boards the vehicle and whether the person is the correct person K. The corresponding information which is required for identifying the person K may here already have been stored by the user N in the remote computer system ER and in particular in the memory S.

The vehicle F then sends a confirmation to the user N that the order is being further executed. Equally, information can be additionally output by the person K, who is to be transported, to the user N, who confirms that the person K is present in the vehicle.

The vehicle F can output the authentication information to the person K. The person K can check the authentication information on the basis of verification information, which the person K receives from the user N and/or the remote computer system ER. The checking can be performed automatically by the telecommunication device of the person K. A display of information to the person K can be performed in a simple manner, e.g. by means of a traffic light indicator (red: don't board, green: boarding OK).

Transmission of the information between the vehicle F, the remote computer system ER, the person K and/or the user N can be carried out in an encrypted manner (by means of DES, 3DES, IDEA, CAST, . . . ). Accordingly, a decryption can be carried out on the side of the user N and/or the person K. In the case of symmetrical encryption methods, it is here not necessary, in contrast to the use of asymmetrical encryption methods, to transmit a public key or generate a private key. It is however possible to also use an essentially known public key infrastructure (PKI) in order to allow encryption of the messages as well as authentication of the vehicle, of the user and/or of the person to be transported.

The positioning unit P here permits ascertaining the position of the vehicle F and outputting corresponding information to the user. A detection of a position can be carried out using conventional positioning systems (GPS, Galileo, GLONASS, . . . ).

Figure 5:
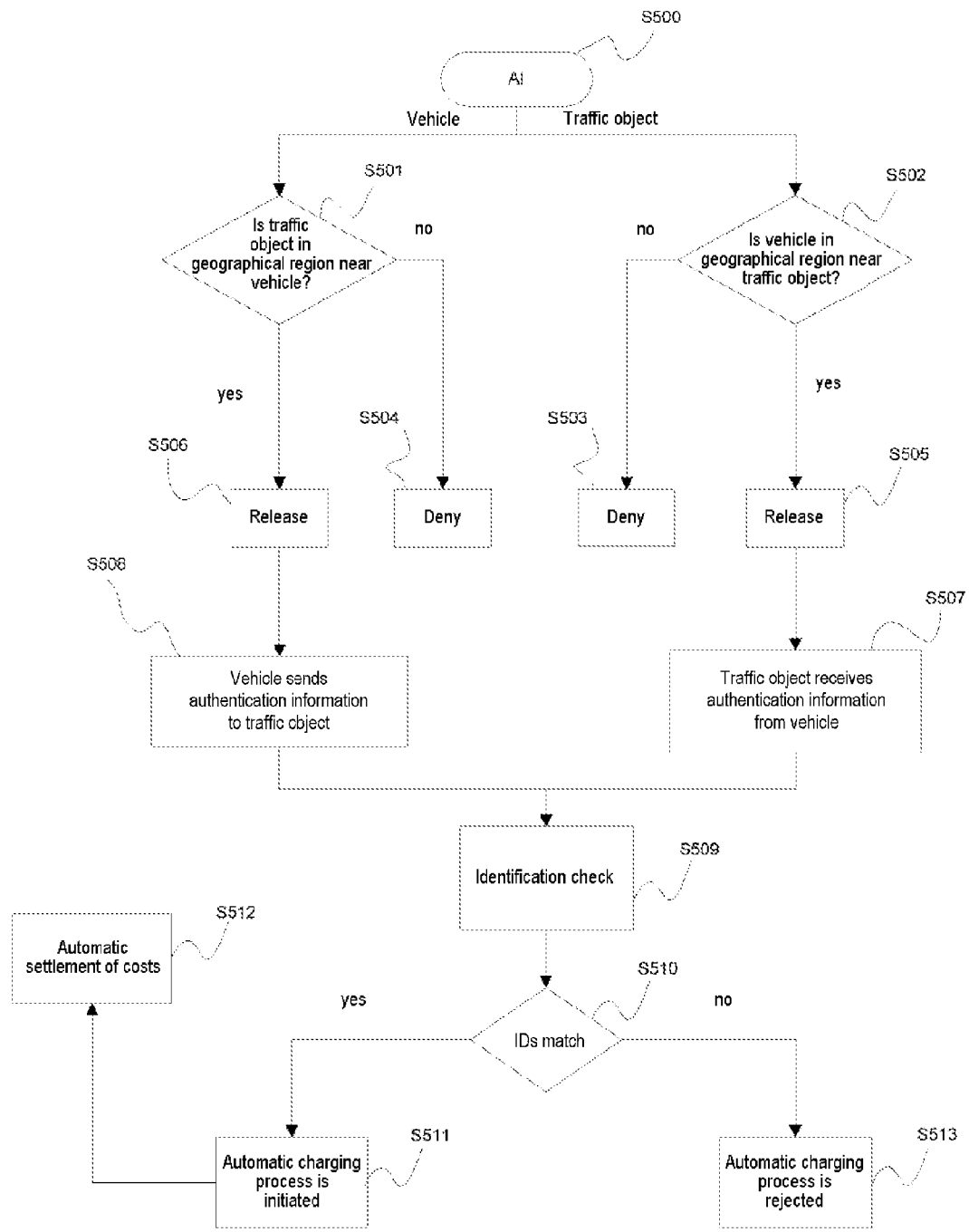
FIG. 5 again shows an application example of the invention.

FIG. 5 shows a further example of the application of the invention. Following receipt of ordering information AI (step S500), the vehicle F checks whether it has entered a defined geographical region, e.g. near a charging station for recharging an energy store (step S501). In parallel thereto the traffic object can check (step S502) whether the vehicle is in a geographical region near the traffic object. To this end positioning information can be exchanged between the vehicle and the traffic object, in particular via the remote computer system ER. Communication can also be effected in ad-hoc communication or for example near-field communication (NFC, RFID), preferably wirelessly. If the vehicle is not in the defined geographical region of the traffic object or vice-versa, a charging process can be denied (step S503 and step S504). However, if this is the case (step S505 and step S506), the vehicle can send authentication information to the traffic object (step S507). The traffic object can then perform the authentication of the vehicle (steps S508 and S509) and confirm that the vehicle is a determined vehicle. This thus allows, for example, a check to be carried out as to whether the correct vehicle executes a charging order (step S510). If the vehicle has been correctly identified, charging of the energy store takes place (step S511) and the charging process is for example automatically billed (step S512). If authentication does not take place, a charging process is denied (step S513).

Authentication at other traffic objects such as a barrier or a carwash device can be performed in a similar manner.

Thus identification or authentication of the vehicle can take place in particular with at least partly autonomously driving vehicles. Autonomously driving vehicles are thus able to identify themselves to a user (e.g. person placing the order), to a traffic object and to other vehicles. In this way an automatic check of the vehicle can be performed and, for example, access to restricted areas can be allowed or denied. Examples of this are here military establishments, parking areas and multi-story carparks. The user can be automatically sent a message, as soon as a person has entered the vehicle. One example already mentioned was also autonomous authentication of the vehicle F at a charging column for an automatic charging process.

The spatial approach to a road traffic object can be here a triggering factor for transmitting the authentication information of the vehicle. For example, when the vehicle enters the receiving/transmitting range of a radio transmission system, the vehicle can automatically send an authentication. The vehicle then can, either through the ordering information or through a signal emitted by a traffic object, also communicate various authentication information, e.g. depending on different levels of security.

Also, with regard to the order, an authentication may be configured with a certain level of security. For passenger transportation for example, a higher security requirement therefore may be configured than for example in the case of transporting items. Insofar as a traffic object can send e.g. a request for authentication to the vehicle and can evaluate the corresponding authentication information sent by the vehicle. Thus the traffic object can, in communication with the autonomous vehicle F, perform an access ruling or the checking of an access authorization. The position-detecting unit P can, in order to determine a position of the vehicle, access further sensors such as external cameras or navigation data.

The memory S can also be divided between the vehicle F and the remote computer system ER, so that a part of the memory S is in the vehicle and a part of the memory S is in the remote computer system ER or the transport system TS and/or is functionally connected thereto. In particular when reaching a destination or intermediate destination, the vehicle can output the authentication information to a person and/or the user N. Thus the person and/or the user N can be sure that he is transported by the correct vehicle. To this end verification information can be sent to the person both by the remote computer system ER and/or the user N. If the vehicle F then sends its authentication information to the passenger PA, the passenger can check whether the correct vehicle has arrived and thus select the correct vehicle for the transport.

In addition, apart from a preferably wireless communication link, optical or acoustic signaling may also be performed by the vehicle, which signaling indicates to the passenger PA which vehicle he has to choose.

In this way it becomes possible for autonomously driving vehicles to be able to identify themselves. Vehicle users and other participants such as vehicles and restricted access systems can rely on the fact that the vehicle is a specific vehicle which for example executes a specific order.

The control unit SE can be sent configuration data and/or an instruction by users N or the telecommunication device TK, a person and/or the remote computer system ER, which configuration data or instruction indicate/indicates that authentication information is to be output as required. The output is therefore dependent on the received configuration data and/or the instruction. The control unit SE receives the configuration data and/or the configuration data at the communication interface KS and/or reads it from the memory S.

The remote computer system ER comprises at least one transmitter for communication and can output or forward the at least one piece of ordering information to the vehicle F. The vehicle then performs an action on this basis. It can communicate the authentication information to the transmitter, preferably when the vehicle receives and/or has previously received a predetermined instruction from the transmitter.

The identifier of the vehicle can also comprise information on a service provider, which offers services by means of the vehicle F. Thus it can also be checked by means of verification of the authentication information whether the vehicle F is operated by a certain service provider. The information relating to the service provider can be supplied to the vehicle F by means of the information supplied to the vehicle F. It is then possible to in particular check whether the vehicle F is operated or sent by the correct service provider. Preferably the vehicle F always comprises at least one unique identifier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An at least partly autonomous vehicle, comprising:
    a communication interface configured for vehicle-external communication;
    a memory configured to store authentication information; and
    a control unit configured to control the communication interface to output:
        (a) the authentication information from the memory, via the communication interface, to a vehicle-external device that is in proximity to the vehicle and is configured to transmit, to a remote user device, verification information, based on the authentication information, that is visibly displayable on the remote user device, and
        (b) the verification information to the remote user device,
    wherein the authentication information is output in response to the control unit receiving one or more instructions for outputting the verification information, and
    wherein the verification information verifies the vehicle as an ordered vehicle.

2. The vehicle according to claim 1, wherein the control unit is configured to:
    generate the authentication information from at least one unique identifier of the vehicle and/or from information supplied to the vehicle,
    store the authentication information in the memory,
    detect the supplied information at the communication interface, wherein the supplied information is ordering information, and
    evaluate the ordering information with regard to a destination and to navigate to the destination.

3. The vehicle according to claim 1, wherein the control unit is configured to output the authentication information via the communication interface in ad-hoc communication, wirelessly, by wire and/or in near-field communication.

4. The vehicle according to claim 1, further comprising a position-detecting unit configured to determine a position of the vehicle and to output the position to the control unit, wherein the control unit is configured to output the authentication information based on the position of the vehicle.

5. The vehicle according to claim 4, wherein the control unit is configured to output the authentication information based on where the determined position is situated with respect to a geographical region.

6. The vehicle according to claim 4, wherein the control unit is configured to output the authentication information based on if the determined position is at a predetermined distance from the geographical region, within the geographical region, coincides with the geographical region and/or crosses a boundary of the geographical region.

7. The vehicle according to claim 1, further comprising a monitoring unit configured to monitor a range of the vehicle and to output monitoring information to the control unit, wherein the control unit is configured to emit a signal based on the monitoring information.

8. The vehicle according to claim 1, further comprising an identification unit configured to:
    detect identification information, and
    output the identification information to the control unit, wherein the control unit is configured to emit a signal based on the identification information.

9. The vehicle according to claim 1, wherein the control unit is configured to monitor the communication interface and, in response to receiving an instruction, to output the authentication information via the communication interface.

10. The vehicle according to claim 1, wherein the control unit is configured to output the authentication information based on received configuration data and/or on an instruction, wherein the configuration data are detected by the control unit at the communication interface and/or are read from the memory.

11. A transport system, comprising
    at least one transmitter configured to output ordering information to an at least partly autonomous vehicle,
    the at least partly autonomous vehicle, comprising:
        a communication interface configured for vehicle-external communication;
        a memory configured to store authentication information; and
        a control unit configured to control the communication interface to output:
            (a) the authentication information from the memory, via the communication interface, to a vehicle-external device that is in proximity to the vehicle and is configured to transmit, to a remote user device, verification information, based on the authentication information, that is visibly displayable on the remote user device, and
            (b) the verification information to the remote user device,
        wherein the authentication information is output in response to the control unit receiving one or more instructions for outputting the verification information,
        wherein the verification information verifies the vehicle as an ordered vehicle, and
        wherein the vehicle is configured to perform an action based on the ordering information and to communicate the authentication information to the transmitter in response to the vehicle receiving a predetermined instruction from the transmitter.

12. The transport system according to claim 11, wherein the transmitter is configured to verify the authentication information using the verification information, wherein the verification information and the authentication information are associated with the ordering information.

13. The transport system according to claim 11, wherein the vehicle is configured to communicate the authentication information to the transmitter, when a determined position of the vehicle is one of at a predetermined distance from a geographical region, within the geographical region, coincides with the geographical region and/or crosses a boundary of the geographical region.

14. The transport system according to claim 12, wherein the vehicle is configured to communicate the authentication information to the transmitter, when a determined position of the vehicle is one of at a predetermined distance from a geographical region, within the geographical region, coincides with the geographical region and/or crosses a boundary of the geographical region.

15. The transport system according to claim 11, wherein the vehicle is configured to output a position, monitoring information and/or identification information to the transmitter.

16. The transport system according to claim 11, wherein the transmitter is configured to:
   confirm the ordering information based on the verified authentication information, the position, the monitoring information and/or the identification information,
   define the ordering information as completed, terminate the ordering information and/or control an actuator.

17. The transport system according to claim 12, wherein the transmitter is configured to:
   confirm the ordering information based on the verified authentication information, the position, the monitoring information and/or the identification information,
   define the ordering information as completed, terminate the ordering information and/or control an actuator.

18. The transport system according to claim 13, wherein the transmitter is configured to:
   confirm the ordering information based on the verified authentication information, the position, the monitoring information and/or the identification information,
   define the ordering information as completed, terminate the ordering information and/or control an actuator.

19. The transport system according to claim 11, wherein the transmitter is a telecommunication device and/or a traffic object.

* * * * *